2,607,617

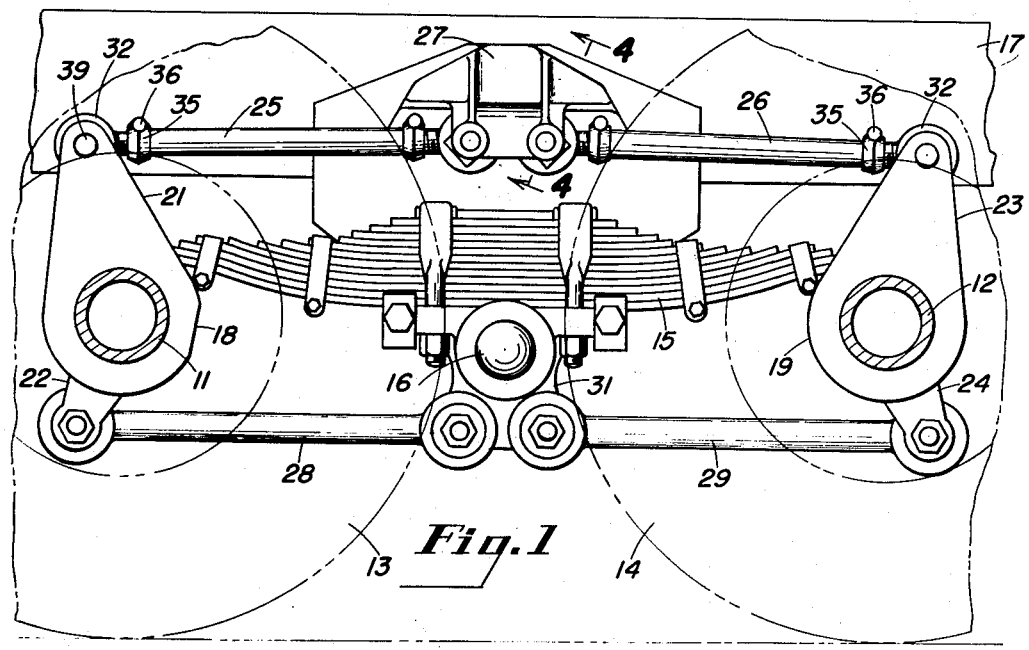
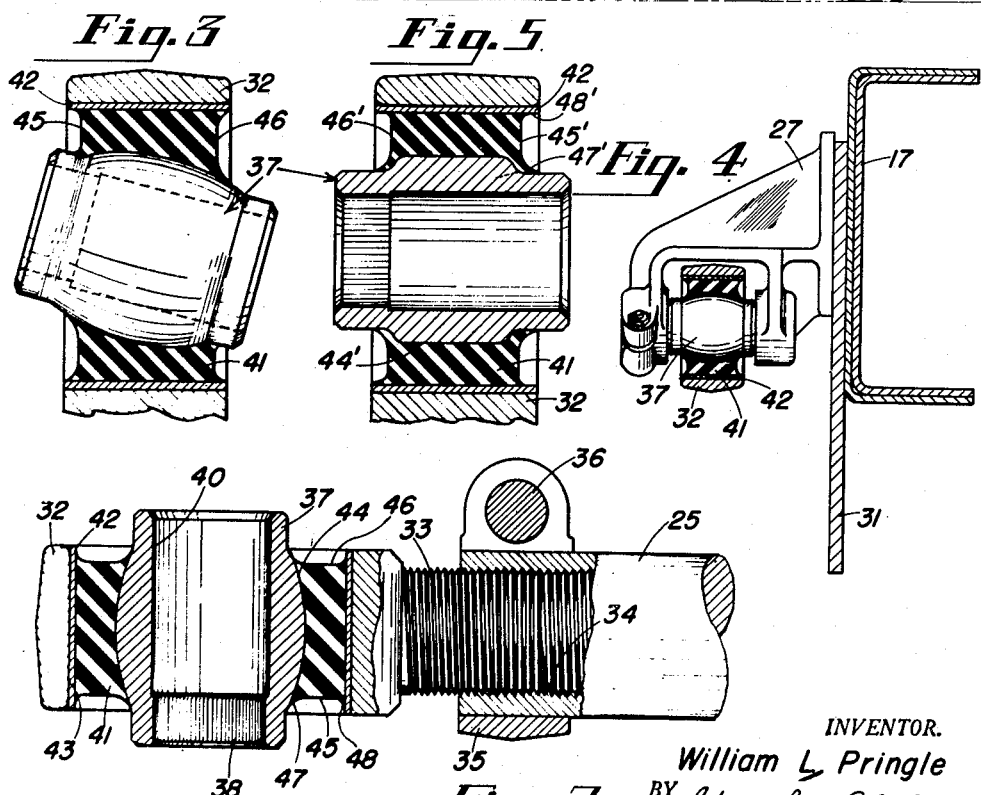
Fig. 1
Fig. 3
Fig. 5
Fig. 4
Fig. 2
INVENTOR.
William L. Pringle
BY Strauch + Hoffman
Attorneys Patented Aug. 19, 1952

UNITED STATES PATENT OFFICE 2,607,617

RESILIENT JOINT

William L. Pringle, Detroit, Mich., assignor to The Timken-Detroit Axle Company, Detroit, Mich., a corporation of Ohio Application June 9, 1947, Serial No. 753,505

1 Claim. (Cl. 287—85)

This invention relates to resilient connections and is more particularly concerned with such connections as are employed for mounting the ends of torque rods associated with tandem axle spring suspensions in heavy duty trucks.

As disclosed in Alden Patent No. 1,990,016, issued February 5, 1935, it is known to form resilient torque rod end joints wherein an annular rubber body is maintained under stress in the space between concentric inner and outer joint members. As disclosed in that patent, axial movement of the rubber body with respect to the concentric members is resisted by permanently bonding the rubber to the inner member, pressing the assembly so formed into a tapered bore in the outer member and providing a retainer ring which is part of the outer member in the larger end of the tapered bore. The stressed rubber body has non-slipping friction engagement with the outer member. This construction has heretofore been considered the most efficient and least expensive prior to the present invention.

In the resilient connection of the present invention an annular body of rubber or like resilient material and optimum shape is perpiherally bonded to and stressed between suitably shaped inner and outer members, and the retaining ring of the Alden patent is eliminated which reduces the expense of parts and assembly time. This connection is essentially a universal joint or rubber bearing at the torque rod ends.

It is a major object of the present invention to provide a novel resilient end connection for a torque rod or the like wherein an annular body of rubber or equivalent resilient material is mounted between inner and outer concentric joint members with the peripheral surfaces of the body bonded permanently to the contacting surfaces of the members, and wherein the body and members are of such optimum dimensions and shape as to provide maximum bonding surface area between the body and members for a given volume of material and to dispose adequate amounts of said material in the regions of said body wherein greater working stresses are encountered during operation.

It is a further object of the invention to provide a novel resilient joint wherein a hollow flat-sided body of resilient material is peripherally bonded between inner and outer members with fillet-like connections between the members and each peripheral edge of the resilient body.

It is a further object of this invention to provide a novel resilient end connection for a torque rod or the like wherein a rubber or equivalent resilient body is stressed between a cylindrical outer shell and an inner prolate spheroidal member to which it is peripherally bonded by contracting the cylindrical shell to a smaller diameter.

It is a further object of this invention to provide a novel but very simple and compact resilient joint construction comprising a resilient body held under stress between relatively rigid concentric inner and outer members, the outer member having a straight cylindrical bore surrounding the resilient body and the inner member having a surface in engagement with said body that is substantially circular in transverse section and of a smaller diameter at its extremities than intermediate thereof. Pursuant to this object the surface of the inner member is preferably substantially the surface of a prolate spheroid.

Another object of this invention is to provide a novel resilient joint wherein the inner member has an external surface substantially circular in transverse cross-section and curved axially about a radius that is larger than the greatest transverse diameter of said surface.

A further object of this invention is to provide a resilient joint comprising an annular body of resilient material compressed between inner and outer concentric members, the body being bonded at its peripheries to the concentric joint members before it is compressed between them, the bonding serving to restrain axial expansion of the compressed body at its peripheries and to control displacement of the resilient material and shape the body to provide adequate material at regions of greatest stress during operation.

A further object of this invention is to provide in a resilent joint wherein an annular resilient body is compressed between concentric members an annular resilient body having a greater volume of resilient material in the regions at its longitudinal extremities than intermediate thereof in order to provide greater volumes of resilient material where the greatest working stresses occur during relative angularity of the joint members in operation and to prevent any substantial localization of working stresses along the body.

A further object of the invention is to provide a novel manner of simplifying and expediting the replacement of a resilient bushing in a torque rod end by providing a resilient bushing assembly that is stressed prior to assembly in said rod end.

Further objects of the invention will become apparent as the description proceeds in connection with the appended claims and the annexed drawings wherein:

Figure 1 is a side elevation illustrating a tandem axle and spring suspension assembly connected to the vehicle frame by torque rods having resilient end connections according to a preferred embodiment of the invention;

Figure 2 is an enlarged illustration of a torque rod end assembly partially in section to show the relation of the parts;

Figure 3 is an enlarged section illustrating the joint of Figure 2 in a stressed condition such as is encountered in operation;

Figure 4 is an enlarged section on line 4—4 of Figure 1 illustrating the joint construction where each torque rod is secured to the vehicle frame; and Figure 5 is a section similar to Figure 2 illustrating a further embodiment of the invention wherein the surface of the inner joint member is mainly cylindrical with suitably curved reduced ends inwardly of the ends of the resilient annulus.

The description continues with reference to the drawings wherein like numerals designate like parts throughout the several figures.

The tandem axle assembly comprises spaced parallel axles 11 and 12 mounted on wheels 13 and 14 and supporting the vehicle load which is transferred to them at each side of the vehicle by leaf springs 15 pivoted at their mid-points at 16 on vehicle frame 17. Axles 11 and 12 are provided at each end with rigid spring end mounting brackets 18 and 19. Bracket 18 has an upwardly extending arm 21 and a downwardly extending arm 22, and bracket 19 has a corresponding upwardly extending arm 23 and a downwardly extending arm 24. Upwardly extending arms 21 and 23 are connected by upper torque rods 25 and 26 to a bracket 27 secured to the vehicle frame above spring 15. Downwardly extending arms 22 and 24 are connected by lower torque rods 28 and 29 to a bracket 31 also rigidly secured to the vehicle frame and located below spring pivot 16 in such a manner as to dispose the lower torque rods in normally parallel relationship to the upper torque rods 18. This parallelogram arrangement of torque rods in such a suspension may be that illustrated in Buckendale Patent No. 1,946,060, issued February 6, 1934, to which attention is directed for further detail. The present invention concerns itself with attachment of the torque rods to the frame brackets.

The torque rods may have a fixed length like rods 28 and 29 or may be adjustable in length as are rods 25 and 26 which, as illustrated in Figure 2, comprise end members 32 threaded as at 33 into radially slotted internally threaded end bores 34 in the rods and are fixed in place by split ring clamps 35 that are tightened about the slotted rod ends by bolts 36.

Referring to Figure 2 the resilient end connection between bracket arm 21 and torque rod end member 32, which with threaded shank 33 is substantially of eye bolt construction, comprises a concentric metal inner member 37 which is rigidly non-rotatably affixed, as by serrations 38 and other suitable fastening means, to a stud 39 rigid with bracket arm 21, and an annular body 41 of rubber or like resilient material under stress and surrounded by a thin cylindrical metal concentric outer member or shell 42 that fits within cylindrical bore 43 of end member 32.

Shell 42, resilient body 41 and inner joint member 37 are combined in a permanent sub-assembly which is then secured within bore 43 before the torque rod is mounted in the vehicle. If desired stud 39 may be assembled within bore 40 of inner joint member 37 prior to mounting the torque rod, in which case member 37 might be an integral formation on stud 39, or may be fixed to bracket arm 21 to receive the assembled torque rod.

Resilient body 41 has its inner and outer peripheries permanently bonded, as by vulcanizing, to cylindrical shell 42 and inner member 37 respectively. Inner member 37 is preferably circular in transverse cross-section so that the member is symmetrical about its axis and intermediate its ends is enlarged as illustrated in Figure 2 with an external surface 44 extending in the direction of its axis. In the preferred embodiment of the invention surface 44 is convexly curved in the longitudinal direction and the longitudinal curvature of surface 44 is continuous and has a radius greater than the largest transverse cross-sectional diameter of inner member 37. Surface 44 in the preferred embodiment represents the envelope generated by moving a curved line in a circular path parallel to and about the axis of member 37. Since the longitudinal curvature of surface 44 is therefore that of a prolate spheroid, surface 44 may also be regarded as the surface generated by rotation of an ellipse about its major axis.

While surface 44 is preferably that of a prolate spheroid symmetrical about the axis of member 37 as above described, it will be understood that its curvature in the longitudinal direction may be modified to some extent without departing from the spirit of the invention. For example, as illustrated in Figure 5 the surface 44' may be cylindrical with its ends merging along longitudinal curves into the smaller ends of member 37. This construction is, however, substantially spheroidal and it will be understood that such and like equivalents are within the intended scope of claim defining the surface as substantially spheroidal.

The essential requirement with respect to surface 44 is that it must have sufficient change of contour to provide adequate bonding surface for resisting axial thrust in the joint, but at the same time it must not be such as to provide a thin section of rubber between the inner and outer members which will be loaded out of proportion during flexure in operation. Also it must be free of sharp corners or other formations tending to create regions of localized stresses in the rubber body between the joint members as the latter become relatively angularly displaced during operation. In a torque rod the joint is subjected mainly to stresses arising from the frequent rocking of the torque arm and the relative angularity, and the repeated flexing of the rubber body will result in failure of the joint wherever there is a combination of relatively high working stress and relatively small volumes of rubber. It is the aim of the invention in avoiding sharp corners, projections and relatively abrupt changes in curvature at surface 44 to secure as equal distribution of stress resistance as possible along the length of the rubber body to prevent regions of localized stress and thereby minimize the chances of failure in the rubber body.

Referring to Figure 2, the resilient body 41, which has its inner and outer surfaces vulcanized or similarly bonded to surface 44 and the inner surface of shell 42 respectively, preferably has substantially flat annular end surfaces 45 and 46 generally normal to the axis of member 37. Each of these end surfaces is formed along its juncture with the joint members with outwardly facing fillets indicated at 47 and 48 which, besides providing additional bonding area for the rubber body and preventing localized stress areas, are also useful in protecting the rubber body against cuts or abrasion that might arise from contact of edges of the metal joint members with the rubber when the joint is stressed as in Figure 3. These fillets also provide room for axial displacement of rubber without undue stress on the bond at the edges of the resilient body.

With reference to Figures 2 and 3, it will be observed that, as the relative positions of the joint members change between the concentricity of Figure 2 and the high angularity of Figure 3, the end regions of annulus 41 which contain the most rubber are subjected to the greatest forces. As illustrated in Figure 3, the regions near surfaces 45 and 46 are considerably and oppositely stressed in compression and tension, as evidenced by their changed radial dimensions, while the medial region of annulus 41 where the annulus is thinnest remains substantially unchanged in thickness because the working stresses are relatively smaller than at the ends and the substantially spheroidal surface at 44 precludes localized stress regions. In the preferred embodiment of the invention I insure adequate thickness of rubber at the thinnest portion of annulus 41 by the above mentioned arrangement wherein the radius of curvature of surface 44 is greater than the greatest diameter of member 37.

Since the joint is symmetrical about the axis of member 37, rocking of the torque rod about that axis is efficiently restrained, and the surface bonding adequately restrains torsion and thrust forces. In general the bushing is subjected to combinations of all these forces, the invention being particularly effective in the condition of Figure 3 alone or in combination with the other working stresses.

While the sub-assembly consisting of the inner and outer joint members and shell 42 may be made up in any manner suitable to produce the above described structure, a preferred method of sub-assembly will be described for purposes of illustration.

A resilient body 41, preferably of rubber, is inserted into the space between the two suitably shaped concentric joint members 37 and 42 and the assembly is placed in a mould and heated to a temperature sufficiently high that the rubber reaches a plastic state and becomes vulcanized to the contacting metal surfaces. In the mould, end faces 45 and 46 of the annulus are originally formed to a decided concave outward contour and the annulus 41 is thicker at its ends.

After the rubber in the moulded sub-assembly has been cured, metal shell 42 which is of a formable metal, such as thin steel, is swedged or otherwise uniformly contracted to a smaller diameter thereby compressing the rubber body in the sub-assembly. During compression the rubber body is free to expand axially except at its peripheries where it is permanently bonded both to shell 42 and member 37 and thereby prevents localization of high stresses at the said peripheries of said body. This axial expansion is effectively a flow or displacement of the resilient material into the end regions of the annulus 41 to thereby increase the amount of resilient material in those regions where the greatest working stresses occur. The increased volume at the end of annulus 41 causes the concavities of surfaces 45 and 46 to reverse until they are generally flat as shown in Figure 2. The retention of fillets at 47 and 48 is insured by the bonded peripheral connection between body 41 and the joint members as the axial expansion is restrained at the peripheries of said body.

In the preferred embodiment of the invention, the degree of contraction of shell 42, the relative volumes of resilient material along body 41 and the contour of end faces 45 and 46 are so balanced and proportioned that this axial expansion of resilient body 41 results in the above described construction.

The united sub-assembly of shell 42, annulus 41 and member 37 is heavily press fitted into the straight cylindrical bore 43 of the torque rod end, thereby non-rotatably locking it within the bore and further stressing the resilient annulus. This entire sub-assembly is removable for replacement or repair without replacing the torque rods themselves which is important commercially.

The above described resilient joint construction is employed at all of the torque rod ends. In Figure 5, the inner member 37 is rigidly and non-rotatably mounted on the depending legs of bracket 27.

The resilient joint construction of the invention is such that any relative movement between outer member 32 and the inner member 37 tends to distort resilient body 41 since the latter is permanently bonded to both of them. Therefore the up and down and relative lateral movements of the axle are resiliently resisted by the torque rods in addition to their function of transmitting brake and drive reaction torque forces to the frame, and shock and impact loads are absorbed without imposing undue strain on the joints. The normal range of angular movement of the torque rods is about twenty-five degrees and this is permitted by the above described structure.

Field replacements of the present invention are greatly simplified due to the fact that the resilient joint is supplied by the manufacturer with the resilient body in a stressed condition and therefore no special tools are needed to crowd the said body into a stressed condition at assembly with the torque rod ends.

Laboratory tests have proven that torque rod ends constructed in accordance with the present invention have a useful life substantially ten times greater than those of prior conventional constructions. This may be attributed to the fact that the resilient bodies in such prior art constructions, due to inherent design and structural limitations hitherto considered necessary, generally had such localization of stresses at regions adjacent their peripheries as to result in separation of the rubber from the members near those regions, whereas the rubber body in the present invention is of such distributed volume as to be substantially free from localized stresses at its bonded peripheries.

In practice, in a torque rod end joint having a thin metal shell 42 of an external diameter of three and one-fourth inches after vulcanization and curing, the rubber is stressed by radially contracting shell 42 to effect a reduction of about one-eighth of an inch in diameter.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

A resilient end connection on a torque rod for a vehicle axle assembly consisting of concentric inner and outer members spaced and connected by an annular radially compressed body of resilient material that is thicker at its ends than intermediate thereof, the inner surface of said outer member being substantially cylindrical and the outer surface of said inner member being substantially prolate spheroidal with its longer axis extending in the same direction as the axis of said cylindrical surface and with said resilient body permanently bonded to both of said surfaces, substantially flat parallel end surfaces on said compressed resilient body disposed generally normal to the axis of said members, and said parallel end surfaces terminating at their inner and outer edges where they join said members in continuously outwardly facing annular fillets that are free of abrupt changes in contour.

WILLIAM L. PRINGLE.

REFERENCES CITED

The following references are of record in the file of this patent:

UNITED STATES PATENTS

| Number | Name | Date |
|---|---|---|
| 1,778,197 | Lord | Oct. 14, 1930 |
| 1,827,233 | Hughes | Oct. 13, 1931 |
| 1,827,234 | Hughes | Oct. 13, 1931 |
| 1,946,060 | Buckendale | Feb. 6, 1934 |
| 2,319,463 | Lear | May 18, 1943 |
| 2,362,008 | Hile | Nov. 7, 1944 |